United States Patent Office 3,577,448
Patented May 4, 1971

3,577,448
BIS(CYCLOPENTADIENYL) COMPOUNDS
OF VANADIUM
John F. Deffner, Glenshaw, Pa., assignor to Gulf Research
& Development Company, Pittsburgh, Pa.
No Drawing. Filed Dec. 26, 1967, Ser. No. 693,057
Int. Cl. C07j 9/00; C08g 7/04; C06d 5/00
U.S. Cl. 260—429           14 Claims

ABSTRACT OF THE DISCLOSURE

β - Diketonatobis(cyclopentadienyl)vanadium nitrates and perchlorates and β-diketonatobis ($C_1$–$C_4$ alkylcyclopentadienyl)vanadium nitrates and perchlorates are disclosed as new compounds useful in modifying the polymerization of an olefin such as styrene. Examples show that polymerization of styrene is accelerated by acetylacetonatobis(cyclopentadienyl)vanadium nitrate; acetylacetonatobis(methylcyclopentadienyl)vanadium perchlorate; 6-methyl - 2,4 - heptanedionatobis(methylcyclopentadienyl) vanadium nitrate; and 1,3-diphenyl-1,3-propanedionatobis (cyclopentadienyl)vanadium perchlorate. Polymerization of styrene is inhibited by 3,5-heptanedionatobis(cyclopentadienyl)vanadium perchlorate.

This invention relates to certain novel organometallic derivatives of cyclopentadiene which are useful in modifying olefin polymerizations, and more particularly to organovanadium derivatives of cyclopentadiene and alkyl-substituted cyclopentadienes.

The organovanadium derivatives of cyclopentadiene of this invention are represented by the following general formula

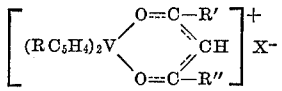

where R is a substituent selected from the group consisting of hydrogen and alkyl radicals having from 1 to 4 carbon atoms; R' and R" are substituents selected from the group consisting of alkyl radicals having from 1 to 12 carbon atoms, aryl (e.g., phenyl and naphthyl) and alkaryl (e.g., tolyl and xylyl) radicals; and X is an inorganic radical selected from the group consisting of nitrate ($NO_3$) and perchlorate ($ClO_4$) radicals. The R' and R" radicals can either be the same or different radicals in the structural formula. Specific examples of compounds of the invention are acetylacetonatobis(cyclopentadienyl)vanadium nitrate
acetylacetonatobis(cyclopentadienyl)vanadium
   perchlorate
acetylacetonatobis(methylcyclopentadienyl)vanadium
   nitrate
acetylacetonatobis(methylcyclopentadienyl)vanadium
   perchlorate
acetylacetonatobis(ethylcyclopentadienyl)vanadium
   nitrate
acetylacetonatobis(ethylcyclopentadienyl)vanadium
   perchlorate
acetylacetonatobis(n-propylcyclopentadienyl)vanadium
   nitrate
acetylacetonatobis(n-propylcyclopentadienyl)vanadium
   perchlorate
acetylacetonatobis(isopropylcyclopentadienyl)vanadium
   nitrate
acetylacetonatobis(isopropylcyclopentadienyl)vanadium
   perchlorate
acetylacetonatobis(n-butylcyclopentadienyl)vanadium
   nitrate
acetylacetonatobis(n-butylcyclopentadienyl)vanadium
   perchlorate
acetylacetonatobis(sec-butylcyclopentadienyl)vanadium
   nitrate
acetylacetonatobis(sec-butylcyclopentadienyl)vanadium
   perchlorate
acetylacetonatobis(isobutylcyclopentadienyl)vanadium
   nitrate
acetylacetonatobis(isobutylcyclopentadienyl)vanadium
   perchlorate
acetylacetonatobis(t-butylcyclopentadienyl)vanadium
   nitrate
acetylacetonatobis(t-butylcyclopentadienyl)vanadium
   perchlorate
2,4-hexanedionatobis(cyclopentadienyl)vanadium
   perchlorate
5,5-dimethyl-2,4-hexanedionatobis(cyclopentadienyl)
   vanadium perchlorate
6-methyl-2,4-heptanedionatobis(methylcyclopentadienyl)
   vanadium nitrate
3,5-heptanedionatobis(cyclopentadienyl)vanadium
   perchlorate
2,4-octanedionatobis(cyclopentadienly)vanadium
   perchlorate
4,6-nonanedionatobis(cyclopentadienyl)vanadium
   perchlorate
4,6-decanedionatobis(cyclopentadienyl)vanadium
   perchlorate
5,7-undecanedionatobis(cyclopentadienyl)vanadium
   perchlorate
5,7-dodecanedionatobis(cyclopentadienyl)vanadium
   nitrate
6,8-tridecanedionatobis(cyclopentadienyl)vanadium
   perchlorate
5,7-tetradecanedionatobis(cyclopentadienyl)vanadium
   perchlorate
7,9-pentadecanedionatobis(cyclopentadienyl)vanadium
   perchlorate
7,9-hexadecanedionatobis(cyclopentadienyl)vanadium
   perchlorate
8,10-heptadecanedionatobis(cyclopentadienyl)vanadium
   perchlorate
8,10-octadecanedionatobis(cyclopentadienyl)vanadium
   nitrate
9,11-nonadecanedionatobis(cyclopentadienyl)vanadium
   perchlorate
9,11-eicosanedionatobis(cyclopentadienyl)vanadium
   perchlorate
10,12-heneicosanedionatobis(cyclopentadienyl)vanadium
   perchlorate
10,12-docosanedionatobis(cyclopentadienyl)vanadium
   perchlorate
11,13-tricosanedionatobis(cyclopentadienyl)vanadium
   perchlorate
11,13-tetracosanedionatobis(cyclopentadienyl)vanadium
   nitrate
12,14-pentacosanedionatobis(cyclopentadienyl)vanadium
   perchlorate
12,14-hexacosanedionatobis(cyclopentadienyl)vanadium
   perchlorate
13,15-heptacosanedionatobis(cyclopentadienyl)vanadium
   perchlorate
1-phenyl-1,3-butanedionatobis(cyclopentadienly)
   vanadium perchlorate
1-phenyl-1,3-heptanedionatobis(cyclopentadienyl)
   vanadium perchlorate
1-phenyl-1,3-heptanedionatobis(cyclopentadienyl)
   vanadium perchlorate
1-phenyl-1,3-undecanedionatobis(cyclopentadienyl)
   vanadium nitrate
1,3-diphenyl-1,3-propanedionatobis(cyclopentadienyl)
   vanadium perchlorate 1,3-dinaphthyl-1,3-propanedionatobis(cyclopentadienyl)
vanadium perchlorate
1,3-ditolyl-1,3-propanedionatobis(cyclopentadienyl)
vanadium perchlorate The novel organovanadium derivatives of cyclopentadiene of this invention are stable solids under normal atmospheric conditions of temperature and pressure. Most of the compounds decompose suddenly upon heating without evidencing a melting point. The lower molecular weight nitrate derivatives are soluble in and unchanged by water. The perchlorate derivatives are insoluble in water. Some of the alkyl-substituted cyclopentadiene derivatives have a limited solubility in aromatic hydrocarbons.

The compounds of the invention can be variously prepared. The compounds, for example, can be prepared at room temperature in a sequence of steps which comprise reacting the dichloride of vanadium bis(cyclopentadienyl) and alkyl-substituted derivatives thereof with silver nitrate and silver perchlorate in the presence of a solvent such as water, acetone, ethanol and mixtures thereof to form the corresponding nitrates and perchlorates of vanadium bis(cyclopentadienyl) and vanadium bis($C_1$–$C_4$ alkylcyopentadienyls). The silver chloride which precipitates from the reaction mass can be removed at this point or it can be left in admixture with the nitrates and perchlorates which are in solution. The nitrates and perchlorates of vanadium bis(cyclopentadienyl) or vanadium bis-($C_1$–$C_4$ alkylcyclopentadienyls) are then reacted with a β-diketone or a β-diketonate salt to form the corresponding diketonatobis(cyclopentadienyl)vanadium nitrates and perchlorates or diketonatobis($C_1$–$C_4$ alkylcyclopentadienyl)vanadium nitrates and perchlorates. Thus, for example, bis(cyclopentadienyl)vanadium dichloride can be reacted with silver nitrate to form the corresponding bis-(cyclopentadienyl)vanadium nitrate which can thereafter be reacted with sodium acetylacetonate or with acetylacetone to form the corresponding acetylacetonatobis(cyclopentadienyl)vanadium nitrate. The perchlorates can be similarly prepared. The nitrates and perchlorates thus obtained can be recovered and purified according to known techniques including solvent extraction, filtration, recrystallization, or the like, dependent upon the nature of the particular compound in question. In recovering and purifying the products, care is required to avoid heating at an elevated temperature inasmuch as a considerable number of the products decompose suddenly without evidencing a melting point. The preparation of the organovanadium derivatives of cyclopentadiene of this invention can be illustrated by the following equations:

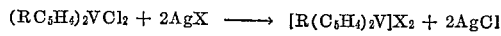

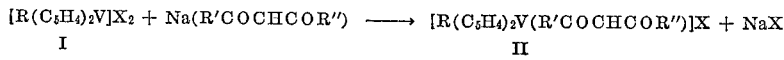

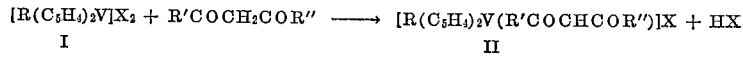

where R, R′, R″ and X are as indicated hereinabove.

The reaction is carried out in the presence of an inert solvent at a temperature within the range of about 0° to 100° C., generally between 0° and 75° C. and most advantageously at room temperature.

In preparing the organovanadium derivatives of cyclopentadiene of the present invention according to the reactions shown in the above equations, the initial reactants comprising bis(cyclopentadienyl)vanadium dichloride and the bis($C_1$–$C_4$ alkylcyclopentadienyl)vanadium dichlorides can be readily prepared by known procedures so that neither of these reactants nor their method of preparation constitutes any portion of the invention. Bis-(methylcyclopentadienyl)vanadium chloride, for example, can be prepared by the same procedure used in preparing bis(methylcyclopentadienyl)titanium dichloride as described in an article entitled "Some Methylcyclopentadienyl-Metal Compounds," by L. T. Reynolds and G. Wilkinson, Journal of Inorganic and Nuclear Chemistry, volume 9, pages 86–92 (1959). If desired, however, the bis(cyclopentadienyl)vanadium dichloride and bis-($C_1$–$C_4$ alkylcyclopentadienyl)vanadium dichlorides can be prepared by reacting cyclopentadienylmagnesium chloride and alkylcyclopentadienylmagnesium chloride with the corresponding vanadium tetrachlorides according to a process for preparing the corresponding titanium, zirconium and hafnium dichlorides which is disclosed in U.S. Pat. No. 2,983,740 which issued on May 9, 1961, John C. Thomas et al. As disclosed in the latter patent, butylmagnesium chloride is first prepared by reacting n-butyl chloride with magnesium turnings in the presence of anhydrous benzene and anhydrous ether. The butylmagnesium chloride is then reacted with cyclopentadiene in an anhydrous benzene solution thereof. The cyclopentadienylmagnesium chloride which is obtained is then reacted with the desired metal tetrachloride in an anhydrous benzene solution thereof to give the corresponding dicyclopentadienyl metal chlorides.

The β-diketones used in preparing the compounds of the present invention either are available commercially or can be readily prepared so that these reactants and their preparation do not constitute any portion of the invention. Examples of the β-diketones which are used in the present invention are 2,4-pentanedione(acetylacetone)
2,4-hexanedione
5,5-dimethyl-2,4-hexanedione
6-methyl-2,4-heptanedione
3,5-heptanedione
2,4-octanedione
4,6-nonanedione
4,6-decanedione
5,7-undecanedione
5,7-dodecanedione
6,8-tridecanedione
5,7-tetradecanedione
7,9-pentadecanedione
7,9-hexadecanedione
8,10-heptadecanedione
8,10-octadecanedione
9,11-nonadecanedione
9,11-eicosanedione
10,12-heneicosanedione
10,12-docosanedione
11,13-tricosanedione
11,13-tetracosanedione
12,14-pentacosanedione
12,14-hexacosanedione
13,15-heptacosanedione
1-phenyl-1,3-butanedione
1-phenyl-1,3-heptanedione
1-phenyl-1,3-undecanedione
1-phenyl-1,3-pentadecanedione
1,3-diphenyl-1,3-propanedione(dibenzoylmethane)
1,3-dinaphthyl-1,3-propanedione
1,3-ditolyl-1,3-propanedione The following examples illustrate specific procedures by which compounds of the invention can be prepared.

EXAMPLE I

Acetylacetonatobis(cyclopentadienyl)vanadium nitrate 7.57 grams (0.03 mole) of bis(cyclopentadienyl)vanadium dichloride is mixed with 50 ml. of water. A solution of 10.19 grams (0.06 mole) of silver nitrate in 50 ml. of water is added to the mixture thus formed with stirring. The color of the mixture turns from green to blue-green simultaneously with the precipitation of silver chloride. The mixture is filtered to remove the silver chloride. 6.6 grams (0.066 mole) of acetylacetone in 25 ml. of ethanol is added to the filtrate. The solution thus formed is stirred for one hour. The aqueous reaction mixture is extracted repeatedly with chloroform until the extract is nearly colorless. The chloroform solvent is removed from the combined extracts under reduced pressure without heating. The residue which is obtained consists of 3.6 grams of a black crystalline solid. The aqueous reaction mixture which has been treated with chloroform is concentrated under reduced pressure with mild heating to one-third of its original volume. The concentrated solution is again subjected to an extraction treatment with chloroform. After removal of the chloroform from the extract 2 grams of additional crude product is obtained. The products are combined and washed with benzene. The washed product is recrystallized from acetone. The recrystallized product, consisting of 3.8 grams of pure acetylacetonatobis(cyclopentadienyl)vanadium nitrate, is a brown crystalline solid which decomposes suddenly, without melting, at 165.5° C. A carbon, hydrogen and nitrogen determination of the product thus obtained shows a favorable comparison to the theoretical analysis for acetylacetonatobis(cyclopentadienyl)vanadium nitrate as follows:

| Ultimate analysis | Found for product | Calculated for acetylacetonatobis (cyclopentadienyl) vanadium nitrate ($C_{15}H_{17}NO_5V$) |
|---|---|---|
| Carbon, percent | 52.53 | 52.64 |
| Hydrogen, percent | 4.84 | 5.01 |
| Nitrogen, percent | 4.14 | 4.09 |
| Molecular weight | 315 | 342 |

The infrared spectrum of the product using a Perkin-Elmer Model 137 Spectrophotometer has bands at 3100, 1580, 1560, 1525, 1430, 1385, 1340, 1285, 1035, 1025, 1015, 950, 940, 855, 835, 788 and 680 cm.$^{-1}$ (in Nujol and Fluorolube).

EXAMPLE II

Acetylacetonatobis(methylcyclopentadienyl)vanadium perchlorate 1.40 grams (0.005 mole) of bis(methylcyclopentadienyl)vanadium dichloride is mixed with 50 ml. of water. A solution of 2.47 grams (0.012 mole) of silver perchlorate in 25 ml. of water is added to the mixture thus formed with stirring. The bis(methylcyclopentadienyl)vanadium dichloride dissolves simultaneously with the precipitation of silver chloride. The mixture is stirred for 5 minutes and filtered. A solution of 1.5 grams (0.015 mole) of acetylacetone in 25 ml. of ethanol is added to the stirred filtrate. A brown precipitate forms almost immediately. The mixture is stirred for 1 hour after which the precipitate is filtered off, washed with water and dried. The crude product thus obtained is recrystallized from ethanol whereupon 1.65 grams of golden brown platelets are obtained. The product decomposes explosively, without melting, at 213° C. The infrared spectrum indicates that the product is acetylacetonatobis(methylcyclopentadienyl)vanadium perchlorate. The infrared spectrum of the product using a Perkin-Elmer Model 137 Spectrophotometer has bands at 3100, 1570, 1545, 1505, 1490, 1430, 1350, 1275, 1095, 1030, 935, 850, 778 and 670 cm.$^{-1}$ (in Nujol and Fluorolube).

EXAMPLE III 3,5-heptanedionatobis(cyclopentadienyl)vanadium perchlorate 1.26 grams (0.005 mole) of bis(cyclopentadienyl)vanadium dichloride is mixed with 50 ml. of water. The mixture is stirred and a solution of 2.07 grams (0.01 mole) of silver perchlorate in 25 ml. of water is added. The mixture is stirred for 5 minutes. The bis(cyclopentadienyl)vanadium dichlororide dissolves simultaneously with the precipitation of silver chloride. The mixture is filtered to remove the silver chloride. A solution of 1.28 grams (0.01 mole) of 3,5-heptanedione in 25 ml. of ethanol is added to the stirred filtrate. A brown precipitate forms almost immediately. The mixture is stirred for 1½ hours after which the precipitate is filtered off, washed with water and dried. The product (1.15 grams) thus obtained is a brown crystalline solid which decomposes explosively at 175° C. without melting. An additional 0.3 gram of product is obtained by extracting the aqueous filtrate with chloroform and concentrating the chloroform extract under reduced pressure, without heating. The infrared spectrum indicates that the product is 3,5-heptanedionatobis(cyclopentadienyl)vanadium perchlorate. The infrared spectrum of the product using a Perkin-Elmer Model 137 Spectrophotometer has bands at 3130, 2980, 2900, 1570, 1520, 1445, 1435, 1390, 1340, 1305, 1255, 1240, 1180, 1095, 1030, 1010, 848, 808, 788 and 723 cm.$^{-1}$ (in Nujol and Fluorolube).

EXAMPLE IV 6-methyl-2,4-heptanedionatobis(methylcyclopentadienyl)vanadium nitrate 1.40 grams (0.005 mole) of bis(methylcyclopentadienyl)vanadium dichloride is mixed with 50 ml. of water. The mixture is stirred and a solution of 1.87 grams (0.011 mole) of silver nitrate in 25 ml. of water is added. The bis(methylcyclopentadienyl)vanadium dichloride dissolves simultaneously with the precipitation of silver chloride. The mixture is stirred for 5 minutes and filtered to remove silver chloride. A solution of 1.42 grams (0.01 mole) of 6-methyl-2,4-heptanedione in 50 ml. of ethanol is added to the stirred filtate. The mixture is stirred for an additional 1½ hours, diluted with 50 ml. of water and extracted with 600 ml. of chloroform in 100 ml. portions. The chloroform extracts are combined and concentrated to dryness by mild heating under reduced pressure. A brown crystalline solid is obtained. The brown crystalline solid is washed with ether and recrystallized from tetrahydrofuran to obtain 1.4 grams of very dark brown needle-like crystals. The product thus obtained melts at 126.5 to 128.5° C. and decomposes at 137° C. A carbon, hydrogen and nitrogen determination of the product thus obtained shows a favorable comparison to the theoretical analysis for 6-methyl-2,4-heptanedionatobis(methylcyclopentadienyl)vanadium nitrate as follows:

| Ultimate analysis | Found for product | Calculated for 6-methyl-2,4-heptanedionatobis(methylcyclopentadienyl)vanadium nitrate ($C_{20}H_{27}NO_5V$) |
|---|---|---|
| Carbon, percent | 57.82 | 58.25 |
| Hydrogen, percent | 6.28 | 6.60 |
| Nitrogen, percent | 3.33 | 3.40 |

The infrared spectrum of the product also indicates that the product is 6-methyl-2,4-heptanedionatobis(methylcyclopentadienyl)vanadium nitrate. The infrared spectrum of the product using a Perkin-Elmer Model 137 Spectrophotometer has bands at 3100, 2950, 2900, 1570, 1520, 1500, 1450, 1420, 1365, 1350, 1325, 1295, 1250, 1235, 1190, 1165, 1040, 1030, 965, 920, 842, 830 and 810 cm.$^{-1}$ (in Nujol and Fluorolube).

EXAMPLE V

1,3-diphenyl-1,3-propanedionatobis(cyclopentadienyl)vanadium perchlorate 1.26 grams (0.005 mole) of bis(cyclopentadienyl) vanadium dichloride is mixed with 50 ml. of water. The mixture is stirred and a solution of 2.07 grams (0.01 mole) of silver perchlorate in 40 ml. of water is added. The mixture is stirred for 5 minutes. The bis(cyclopentadienyl)vanadium dichloride dissolves simultaneously with the precipitation of silver chloride. The mixture is filtered to remove the silver chloride. A solution of 1.12 grams (0.005 mole) of dibenzoylmethane in 35 ml. of ethanol is added to the stirred filtrate. Stirring is continued for 30 minutes. A brown crystalline precipitate is formed. The precipitate is filtered off, washed with water and recrystallized from acetone. The product consisting of 0.3 gram of dark brown crystals decomposes explosively at 212° C. without melting. The infrared spectrum indicates that the product is 1,3-diphenyl-1,3-propanedionatobis(cyclopentadienyl) vanadium perchlorate. The infrared spectrum of the product using a Perkin-Elmer Model 137 Spectrophotometer has bands at 3130, 1590, 1540, 1525, 1480, 1450, 1440, 1360, 1350, 1310, 1230, 1190, 1165, 1100, 1025, 1015, 980, 835, 783, 722, 705 and 688 cm.$^{-1}$ (in Nujol and Fluorolube).

Acetylacetonatobis (cyclopentadienyl) vanadium perchlorate is prepared in the same manner as that used in Example 1, except that silver perchlorate is used instead of silver nitrate. Acetylacetonatobis ($C_1$ to $C_4$ alkylcyclopentadienyl)vanadium nitrates are prepared in the same manner as that used in Example I, except that the corresponding bis ($C_1$–$C_4$ alkylcyclopentadienyl)vanadium dichloride is used instead of bis(cyclopentadienyl)vanadium dichloride. The nitrates and perchlorates of other β-diketonatobis(cyclopentadienyl)vanadium and β - diketonatobis(alkylcyclopentadienyl)vanadium compounds are prepared in the same manner as that used in Examples III, IV and V using the appropriate diketone, bis(cyclopentadienyl)vanadium dichloride or bis ($C_1$–$C_4$ alkylcyclopentadienyl) vanadium dichloride and silver nitrate or silver perchlorate.

The compounds of this invention are valuable in modifying reactions involving the polymerization of olefins. I have found, for example, that acetylacetonatobis (cyclopentadienyl)vanadium nitrate; acetylacetonatobis (methylcyclopentadienyl)vanadium perchlorate; 6-methyl-2,4-heptanedionatobis(methylcyclopentadienyl)vanadium nitrate; and 1,3 - diphenyl-1,3-propanedionatobis(cyclopentadienyl) vanadium perchlorate are useful in accelerating the polymerization of styrene. I have found that 3,5-heptanedionatobis(cyclopentadienyl)vanadium perchlorate is useful in inhibiting the polymerization of styrene.

In order to illustrate the effect which compounds of the invention have in modifying the polymerization of an olefin, comparative polymerization tests have been made with styrene and styrene containing a compound of the invention. In these tests, 10 cc. of freshly distilled styrene and 10 cc. of freshly distilled styrene containing 0.025 gram of a compound to be tested are separately heated at 60° C. until the styrene is polymerized to an extent that it is too viscous to flow. The time required to reach a "no flow" condition is taken as a measure of the polymerization modifying characteristics of the compound. The results of the polymerization tests are set forth in the following table:

| Compound tested: | Heating time in hours required for styrene to reach a "no flow" condition |
|---|---|
| None (control test) | 99 |
| Acetylacetonatobis (cyclopentadienyl) vanadium nitrate | 42 |
| Acetylacetonatobis(methylcyclopentadienyl) vanadium perchlorate | [1] <42 |
| 3,5 - heptanedionatobis(cyclopentadienyl) vanadium perchlorate | [2] >300 |
| 6 - methyl - 2,4 - heptanedionatobis(methylcyclopentadienyl)vanadium nitrate | [1] <42 |
| 1,3 - diphenyl - 1,3 - propanedionatobis(cyclopentadienyl)vanadium perchlorate | 20 |

[1] These blends were not observed between 27 and 42 hours. The blend with 6-methyl-2,4-heptanedionatobis(methylcyclopentadienyl)vanadium nitrate was a hard solid in 42 hours. The blend with acetylacetonatobis(methylcyclopentadienyl) vanadium perchlorate was a soft flexible solid in 42 hours.
[2] The blend containing 3,5-heptanedionatobis(cyclopentadienyl)vanadium perchlorate was still fluid at 300 hours.

The data set forth in the above table clearly indicate that the vanadium compounds of the invention are useful in modifying the rate at which styrene is polymerized.

While the organometallic derivatives of cyclopentadiene have been described with particular reference to their ability to modify the degree to which olefins are polymerized, the compounds of the invention may also serve as components for rocket fuels, oxidation catalysts, hydrogenation catalysts, nitrogen reducing catalysts, cetane improvers, antistatic agents, paint dryers, resin curing agents and combustion improvers for fuels.

While my invention has been described with reference to various specific examples and embodiments, it will be understood that the invention is not limited to such examples and embodiments and may be variously practiced within the scope of the claims hereinafter made.

I claim:
1. An organovanadium derivative of cyclopentadiene represented by the general formula

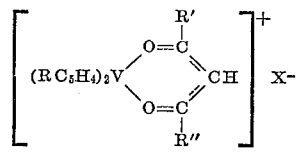

where R is a substituent selected from the group consisting of hydrogen and alkyl radicals having from 1 to 4 carbon atoms; R′ and R″ are substituents selected from the group consisting of alkyl radicals having from 1 to 12 carbon atoms, aryl and alkaryl radicals; and X is an inorganic radical selected from the group consisting of nitrate ($NO_3$) and perchlorate ($ClO_4$) radicals.

2. Acetylacetonatobis(cyclopentadienyl)vanadium nitrate.

3. Acetylacetonatobis(cyclopentadienyl)vanadium perchlorate.

4. Acetylacetonatobis (methylcyclopentadienyl) vanadium nitrate.

5. Acetylacetonatobis (methylcyclopentadienyl) vanadium perchlorate.

6. Acetylacetonatobis (ethylcyclopentadienyl) vanadium nitrate.

7. Acetylacetonatobis (ethylcyclopentadienyl) vanadium perchlorate.

8. Acetylacetonatobis (propylcyclopentadienyl) vanadium nitrate.

9. Acetylacetonatobis (propylcyclopentadienyl) vanadium perchlorate.

10. Acetylacetonatobis (butylcyclopentadienyl) vanadium nitrate.

11. Acetylacetonatobis (butylcyclopentadienyl) vanadium perchlorate.
12. 3,5 - heptanedionatobis (cyclopentadienyl) vanadium perchlorate.
13. 6 - methyl - 2,4 - heptanedionatobis (methylcyclopentadienyl) vanadium nitrate.
14. 1,3 - diphenyl - 1,3 - propanedionatobis(cyclopentadienyl) vanadium perchlorate.

No references cited.

TOBIAS E. LEVOW, Primary Examiner
A. P. DEMERS, Assistant Examiner

U.S. Cl. X.R.

44—68; 106—310; 252—384, 400, 431

PO-1050
(5/69)

UNITED STATES PATENT OFFICE
CERTIFICATE OF CORRECTION

Patent No. 3,577,448            Dated May 4, 1971

Inventor(s) John F. Deffner

It is certified that error appears in the above-identified patent and that said Letters Patent are hereby corrected as shown below:

Column 2, line 63, "1-phenyl-1,3-butanedionatobis(cyclopentadienly)" should read --1-phenyl-1,3-butanedionatobis(cyclopentadienyl)--;

lines 67 and 68, delete "1-phenyl-1,3-heptanedionatobis(cyclopentadienyl)vanadium perchlorate";

lines 70 and 71, after "vanadium nitrate" and before "1,3-diphenyl-1,3-propanedionatobis(cyclopentadienyl)vanadium perchlorate" insert --1-phenyl-1,3-pentadecanedionatobis(cyclopentadienyl)vanadium perchlorate--.

Column 3, line 75, "chloride" should read --dichloride--.

Signed and sealed this 14th day of September 1971.

(SEAL)
Attest:

EDWARD M. FLETCHER, JR.
Attesting Officer

ROBERT GOTTSCHALK
Acting Commissioner of Patents